United States Patent
Brown

[19]

[11] Patent Number: 6,027,342
[45] Date of Patent: Feb. 22, 2000

[54] MOTION PLATFORM ASSEMBLY FOR FLIGHT AND VEHICLE SIMULATION

[75] Inventor: Jeff R. Brown, Duluth, Ga.

[73] Assignee: Stricor, Inc., Norcross, Ga.

[21] Appl. No.: 09/159,374

[22] Filed: Sep. 23, 1998

[51] Int. Cl.⁷ .................................................. G09B 9/14
[52] U.S. Cl. .............................. 434/55; 434/58; 472/130
[58] Field of Search .................................. 472/59, 60, 61, 472/130; 434/29, 33, 37, 45, 55, 58, 59

[56] References Cited

U.S. PATENT DOCUMENTS

| | | |
|---|---|---|
| 3,577,655 | 5/1971 | Pancoe . |
| 3,645,011 | 2/1972 | Callanen . |
| 4,343,610 | 8/1982 | Chou . |
| 4,753,596 | 6/1988 | Hart et al. . |
| 5,009,412 | 4/1991 | Roodenburg et al. ............ 472/59 |
| 5,176,518 | 1/1993 | Hordijk et al. . |
| 5,179,525 | 1/1993 | Griffis et al. . |
| 5,347,811 | 9/1994 | Hasegawa et al. ............. 60/426 |
| 5,366,375 | 11/1994 | Sarnicola ..................... 434/37 |
| 5,400,889 | 3/1995 | Bell et al. ................... 192/113.3 |
| 5,669,773 | 9/1997 | Gluck . |
| 5,752,834 | 5/1998 | Ling . |

*Primary Examiner*—Kien T. Nguyen
*Attorney, Agent, or Firm*—Jones & Askew, LLP

[57] ABSTRACT

A motion platform assembly having at least three degrees of freedom for providing simulated motion in a flight or vehicle simulator. The motion platform assembly includes a base frame, mounting pedestal and a stabilized platform. The simulator is powered by actuators that independently effect movement with respect to the base frame by extending to increase and decrease a length. Stabilizers stabilize the motion platform assembly by restricting movement of the stabilized platform while only permitting vertical translation of the stabilized platform relative to the mounting pedestal in both directions. In one embodiment, the stabilizers are unpowered linear bearings extendable to increase and decrease a length thereof between the mounting pedestal and the stabilized platform. The linear bearings resist the shear forces acting upon the stabilized platform when the stabilized platform is vertically extended from the mounting pedestal. Because the actuators power the motion simulator and leave the stabilizers to stabilize the motion platform, the actuators may operate more efficiently.

21 Claims, 7 Drawing Sheets

MOTION PLATFORM ASSEMBLY FOR FLIGHT AND VEHICLE SIMULATION

FIELD OF THE INVENTION

The present invention relates to a motion platform assembly of a motion simulator commonly utilized to provide controlled movement of the simulator within specified limits. This invention more particularly pertains to improvements for controlling the motion platform assembly of the motion simulator.

BACKGROUND OF THE INVENTION

Presently, there is a wide variety of motion simulators adaptable to various applications that are commercially available. These simulators allow the human brain to experience apparent motion by a combination of momentary movements. To achieve this simulation of movement, the simulators are varied in structure and arrangement. There are six degrees of freedom systems primarily used for simulating the flying characteristics of aircraft. With six degrees of freedom, the simulator is capable of moving in three linear directions and three angular directions singularly or in any combination. The six degrees of freedom are commonly referred to as pitch, roll, yaw, surge, sway and heave. One such prior art motion simulator system introduced in 1965 is known as a "Stewart platform." For many applications, six degrees of freedom are not needed.

There are also simplified three or four degrees of freedom systems typically utilized for simulating less sophisticated aircraft and ground vehicles. These simplified motion simulators are also utilized in 3-D games and movement simulators typically found in arcades. Compared to six degrees of freedom systems, the three degrees of freedom systems, for example, only permit movement for simulating pitch, roll and heave.

However, these known motion simulation systems are often plagued by geometrical complexities. Therefore, these systems are difficult to design and manufacture without complicated arrangements. These complications typically include interference between extendable members that provide movement such as lift. The extendable members also provide stability to the motion simulation system.

Typically, the extendable members are conventional hydraulic actuators having a cylinder housing, plunger and piston. The piston is mounted on the bottom end of the plunger and is sized for being received into the cylinder housing. The plunger is slidingly engaged to the cylinder housing and is selectively raised and lowered in the cylinder housing in response to controlled pressure via a hydraulic system.

Although the three degrees of freedom systems drastically reduce the number of complications compared to the six degree of freedom systems, there is room for improvement in the design of these known motion simulators. For example, the number of parts can be reduced and the range of movement required for creating a desired effect can be narrowed. Reducing both the number of parts and the range of motion required to effectively operate the simulators prolongs their life while also reducing their manufacture and maintenance costs.

For example, a great number of commercially available simulators have actuators which are crossed in a complicated manner that interfere with one another. Each crossed actuator has a limited range of motion due to the proximity of the adjacent actuator. Alternatively, the actuators may be positioned in a substantially upright or vertical manner. Vertically-oriented actuators have a broader range of motion because there is no possibility of interfering with an adjacent actuator. Another advantage associated with vertically-oriented actuators is that the movement of the simulator created in response to actuating the vertically-oriented actuators is more efficient. The crossed actuators have to extend further to create the same movement that vertically-oriented actuators can create with less of an extension. Because the upright actuators can be smaller, the hydraulics necessary to operate the actuators maybe simplified. Therefore, a more direct simulated movement is created in response to movement of the vertically-oriented actuators with a more economical and easily manufactured motion simulator.

A motion simulator supported by only upright actuators at each corner is uncontrollable because it is capable of six degrees of freedom. However, this six degrees of freedom system can be controlled by permitting only three degrees of freedom. Without supports to maintain the vertically-oriented actuators in an upright manner, a six degrees of freedom system will collapse. Furthermore, when the plunger of an actuator is raised in the cylinder housing, the shear forces created by the movement of the simulator allow the cylinder housing and plunger to flex. This undesirable flexing motion creates unrealistic movement and exposes the actuator to excessive wear. Therefore, the amount of heave that vertically-oriented actuators are allowed to create is limited by the shear forces acting upon them.

In response to the realized inadequacies of these earlier motion simulators, it became clear there is a need for a more efficient and simplified motion simulator. This simplified motion simulator must have substantially vertically-oriented actuators that power the motion simulator by providing motion to the simulator, but which do not themselves stabilize the motion simulator. Therefore, this novel motion simulator must also provide a stabilizing system that maintains the actuators in an upright position, prevents the flexing of extended actuators, but which allows vertical translation in both directions.

BRIEF SUMMARY OF THE INVENTION

The present invention alleviates or solves the above-described problems in the prior art by providing an improved motion platform assembly for flight and vehicle simulation. The present apparatus seeks to provide an efficient apparatus and method of simulating movement with a three degree of freedom motion platform assembly having a geometrically-simple configuration, while also restricting the movements of the motion platform assembly to minimize the undesirable forces acting upon the motion simulator.

In accordance with the present invention, this object is accomplished by providing a motion platform assembly for simulated motion having a base frame, a mounting pedestal and a stabilized platform. Actuators coupled to the base frame effect movement with respect to the base frame. Stabilizers stabilize the motion platform assembly while restricting movement of the motion platform assembly relative to the base frame. The stabilizers permit vertical translation of the stabilized platform relative to the mounting pedestal in both directions.

In an exemplary embodiment of the present invention, the actuators are hydraulic actuators oriented substantially vertically in relation to the base frame. Adjacent vertically-oriented actuators do not cross over one another. The stabilizers are unpowered linear bearings that extend to increase and decrease their length. The linear bearings resist shear forces acting upon the stabilized platform when the stabilized platform is vertically extended from the mounting pedestal. The linear bearings also restrict the motion platform assembly to four degrees of freedom.

Motion platform assemblies having a stabilizing system formed in accordance with the present invention have a number of advantages. An important advantage of the novel motion platform assembly is the ability to restrict movement of the motion platform assembly while permitting vertical translation of the stabilized platform in both directions.

Accordingly, an object of this invention is to provide an improved motion platform assembly for flight and vehicle simulation that overcomes the aforementioned inadequacies of prior art motion platform assemblies.

Another object of the present invention is to provide an improved motion simulator capable of providing efficient and realistic simulated movement.

Still another object of the present invention is to provide a structurally simple and economical motion platform assembly for flight and vehicle simulation.

Yet another object of the present invention is to provide a geometrically simple motion platform assembly.

Still yet another object of the present invention is to provide a motion platform assembly having the smallest possible hydraulic system.

The foregoing has broadly outlined some of the more significant objects and features of the present invention. These should be construed to be merely illustrative of some of the more prominent features and applications of the intended invention. Many other beneficial results can be obtained by applying the disclosed invention in a different manner or by modifying the disclosed embodiments. Accordingly, other objects and a more comprehensive understanding of the invention may be obtained by referring to the detailed description of the preferred embodiment taken in conjunction with the accompanying drawings, in addition to the scope of the invention defined by the claims. For a more succinct understanding of the nature and objects of the present invention, reference should be directed to the following detailed description taken in connection with the accompanying drawings.

BRIEF DESCRIPTION OF THE DRAWINGS

Similar reference characters refer to similar parts throughout the several views of the drawings.

DETAILED DESCRIPTION OF THE PREFERRED EMBODIMENTS

With reference to the drawings, a new and improved motion platform assembly embodying the principles and concepts of the present invention and generally designated by the reference number 20 will be described.

Figure 1:
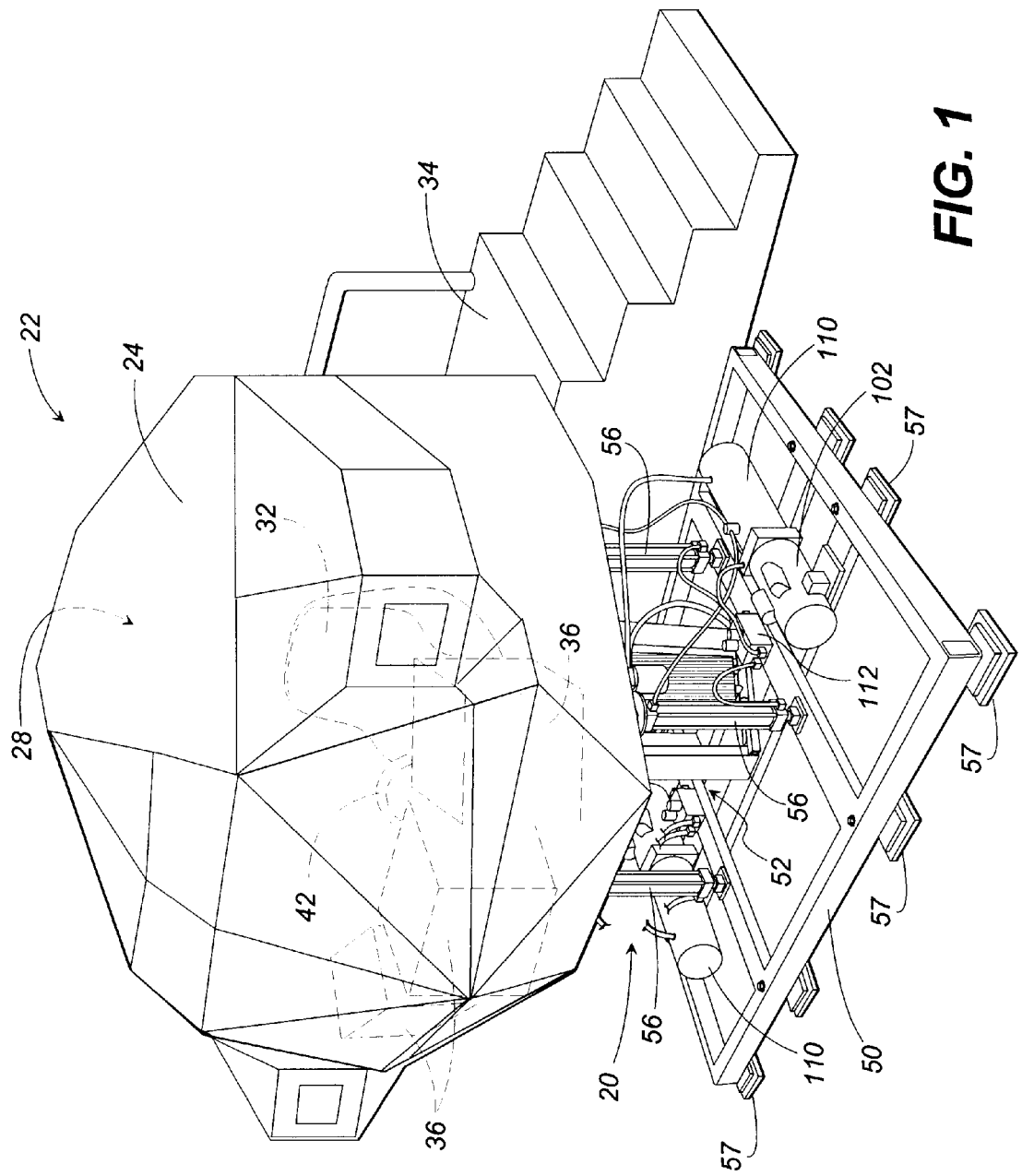
FIG. 1 is a front perspective view of one embodiment of a motion simulator embodying one embodiment of the present invention.
Figure 2:
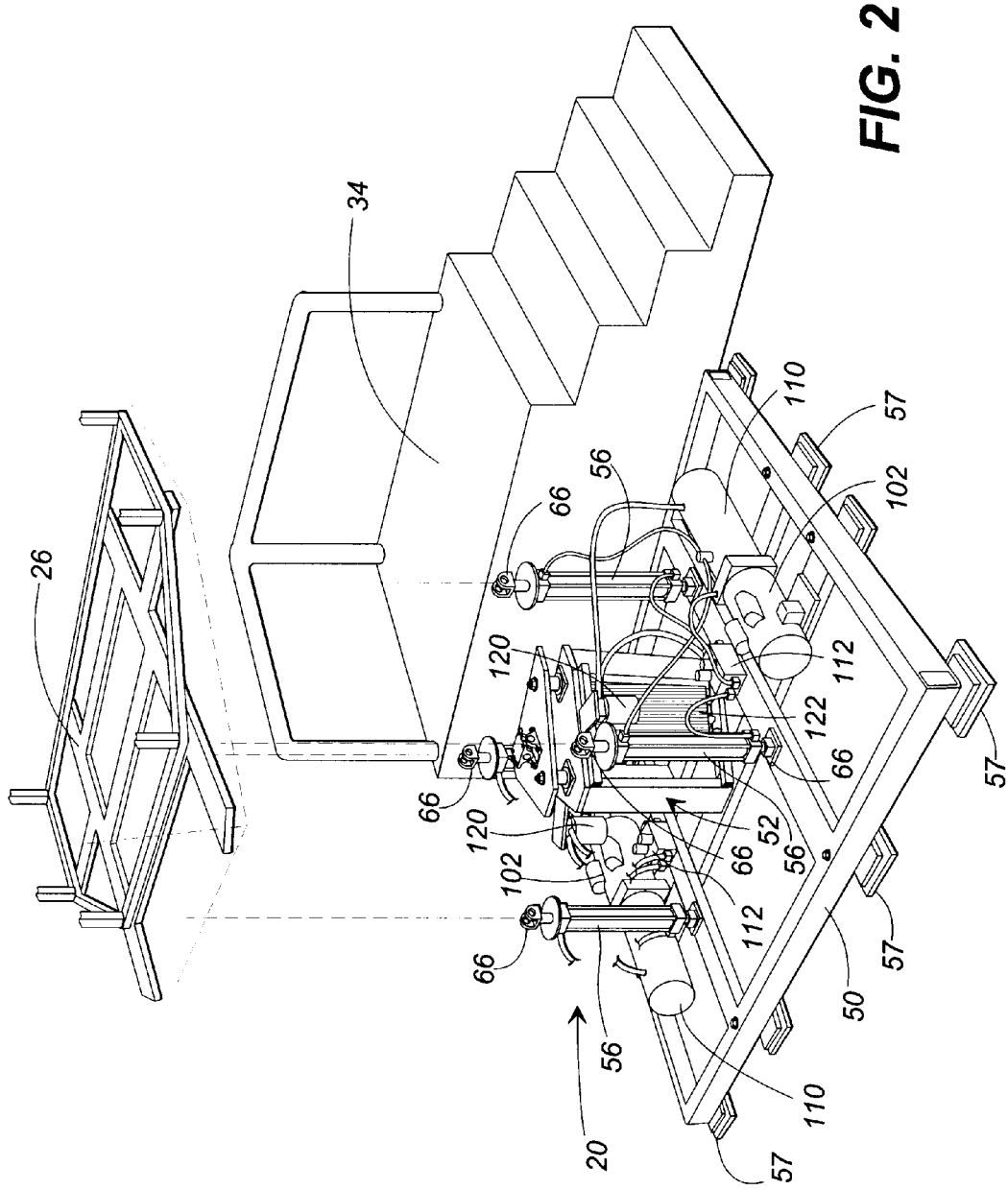
FIG. 2 is a partial front perspective view of the simulator of FIG. 1 illustrating, in particular, a motion platform assembly.

In accordance with one exemplary embodiment incorporating the present invention, FIG. 1 illustrates a semi-enclosed motion simulator 22 having a fiberglass-molded shell 24 built around a steel tubing cage 26. The cage 26 is also known as a motion platform upon which the fiberglass-molded shell 24 forms a cockpit 28 with at least one seat 32. A partial view of the cage/platform 26 is shown in FIG. 2. A step and landing assembly 34 leads up to the back of the cockpit 28. The cockpit 28 further includes monitors 36 and a stereo system (not shown) to heighten the motion simulator experience. The seat 32 and monitors 36 are shown in phantom. The steel tubing cage 26 is fixedly secured to the motion platform assembly 20 as described below. The movements of the motion platform assembly 20 are transmitted to the cockpit 28 of the simulator 22. A controller 40 (FIG. 10) receives input from the user via a joystick or steering wheel console 42 which is also shown in phantom.

Figure 3:
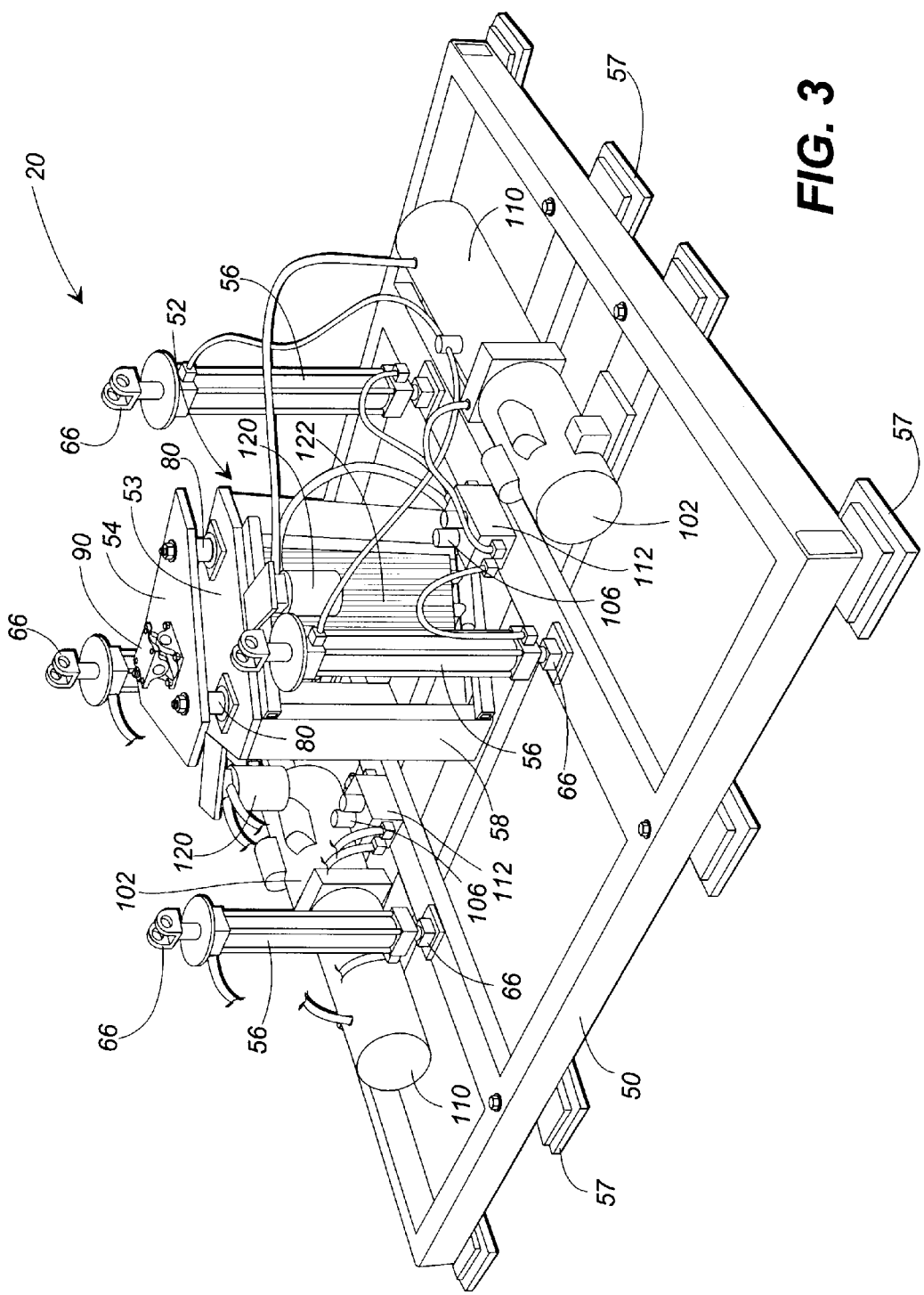
FIG. 3 is a front perspective view of the motion platform assembly of FIG. 2.
Figure 4:
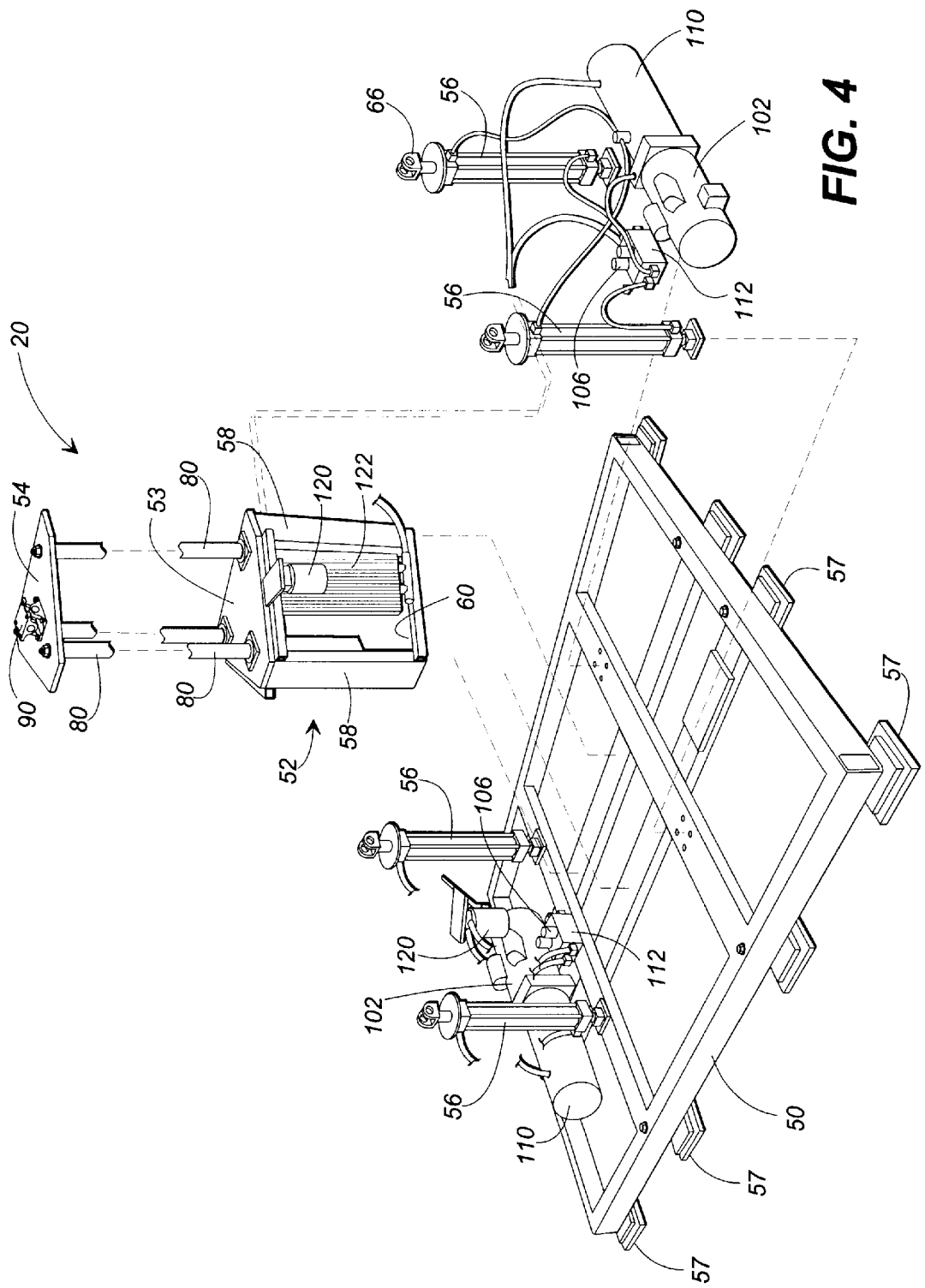
FIG. 4 is an exploded view of the motion platform assembly of FIGS. 2 and 3.

In the embodiment shown in FIGS. 2–4, the motion platform assembly 20 is a 4-cornered system that includes a base frame 50, mounting pedestal 52 having a mounting platform 53, stabilized platform 54, and a plurality of actuators 56. The base frame 50 is preferably formed from a plurality of steel tubing suitably interconnected by generally known means, such as welding or bolting, to define a robust truss design. The base frame 50 should include padding 57 to prevent vibration of the motion simulator 22 along the ground.

The mounting pedestal 52 and stabilized platform 54 are made of any rigid material suitable for withstanding the vibrations and extreme forces typically associated with the continuous operation of a motion simulator. Preferably, the mounting pedestal and stabilized plate are made of steel. As shown in FIG. 4, three supports 58 extend downward from the mounting platform 53 to a panel member 60 to form the mounting pedestal 52. The panel member 60 is secured to the base frame 60 with fasteners or is welded so that the mounting platform 53 and the stabilized plate 54 are permanently positioned substantially parallel with the base frame 50.

The preferred actuators 56 employed by the present invention are preferably 12 inch hydraulic actuators which are connected near each corner of the base frame 50 and the cage 26 as best shown in FIG. 2. Alternatively, equivalent actuators, such as those responsive to pneumatic or electronic signals, may instead be utilized to produce a mechanical force. The actuators 56 are substantially vertically oriented. Each of the actuators 56 are independently extendable to increase and decrease a length L (FIGS. 5–7) thereof between the base frame 50 and the cage 26. Each actuator 56 has a different length L when the motion simulator is tilted. Thus, the length L is confined by its minimum length $L_1$ and its maximum length $L_2$. The actuators 56 effect movement of the cockpit 28 with respect to the base frame 50. Hydraulic actuators 56 suitable for use in the present invention are available from Sheffer Corp., Cincinnati, Ohio. To the extent that the motion platform 20 has been described, the motion platform is capable of six degrees of freedom and is therefore uncontrollable. However, the degrees of freedom of the motion platform assembly 20 can be limited as described below. Preferably, the motion platform assembly 20 of the present invention only permits three degrees of freedom as described in greater detail below.

The actuators 56 include a cylinder housing having a top end and a bottom end. The bottom end of the cylinder housing is connected to the base frame 50 with a linkage best known as a universal joint 66 as best shown in FIG. 3. The actuators 56 also include a plunger having a top end and a bottom end. The top end of the plunger is connected to the cage 26 with another universal joint 66 and the bottom end of the plunger is slidingly engaged to the top end of the cylindrical housing. The actuator 56 also includes a piston mounted to the bottom end of the plunger. The piston is confined inside the cylindrical housing.

The present invention further comprises a stabilizing assembly for maintaining the mounting pedestal in an operational relationship relative to the base frame 50 as explained below. The stabilizing assembly also confines movement of the stabilized platform relative to the mounting pedestal as explained below. In one embodiment, the stabilizing assembly includes at least two unpowered, self-aligning linear bearings 80. Preferably, the present invention includes three linear bearings 80 as shown in FIG. 4. Although the use of only two linear bearings is acceptable, three linear bearings are preferred in order to prevent the stabilized platform 54 from twisting in relation to the mounting pedestal 52. Linear bearings 80 suitable for use in the present invention are available from Pacific Bearing Co., Rockford, Ill. However, the stabilizing assembly includes equivalent structures that confine movement of the stabilized platform 54 relative to the mounting platform 53 to resist and/or absorb shear forces by permitting only vertical movement of the stabilized platform 54 relative to the mounting platform 53.

As previously explained, four actuators 56 coupled to the base frame 50 and the cage 26 with universal joints 66 creates a system capable of six degrees of freedom. Such a motion simulator that is capable of six degrees of freedom will collapse because the actuators 56 are allowed to fall over. However, in the present invention, only three degrees of freedom are preferred. The linear bearings 80 eliminate two linear degrees of freedom, surge and sway, by maintaining the actuators 56 in an upright position. Therefore, only four degrees of freedom are permitted. Moreover, if one or more of the actuators 56 experiences a catastrophic failure, the linear bearings 80 maintains the motion platform assembly 20 in a stable position.

Figure 5:
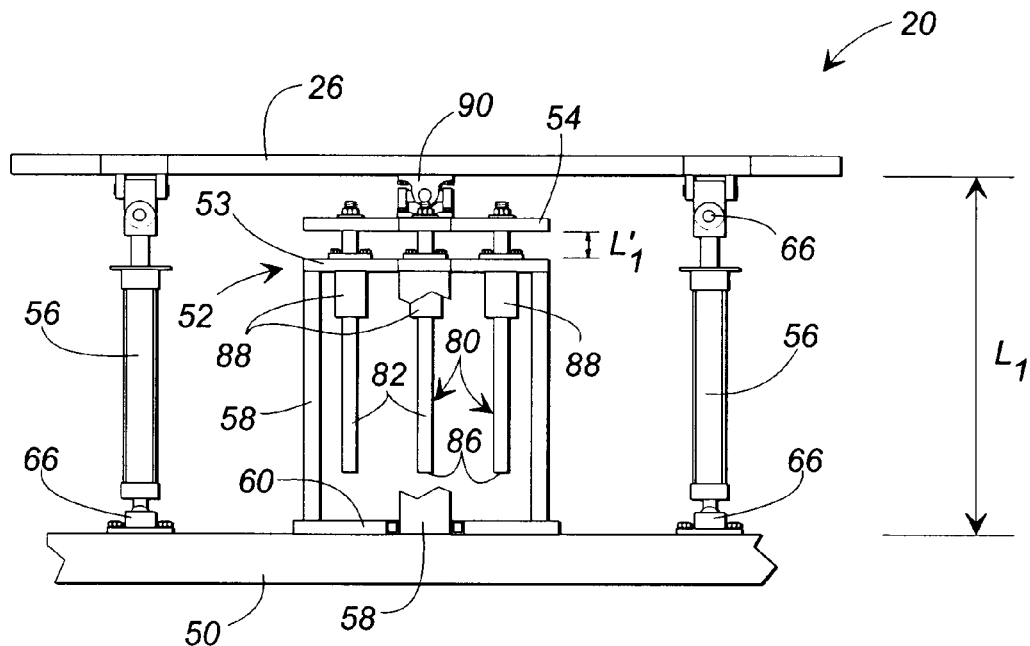
FIG. 5 is a front side view of the motion platform assembly where the actuators are not extended.
Figure 6:
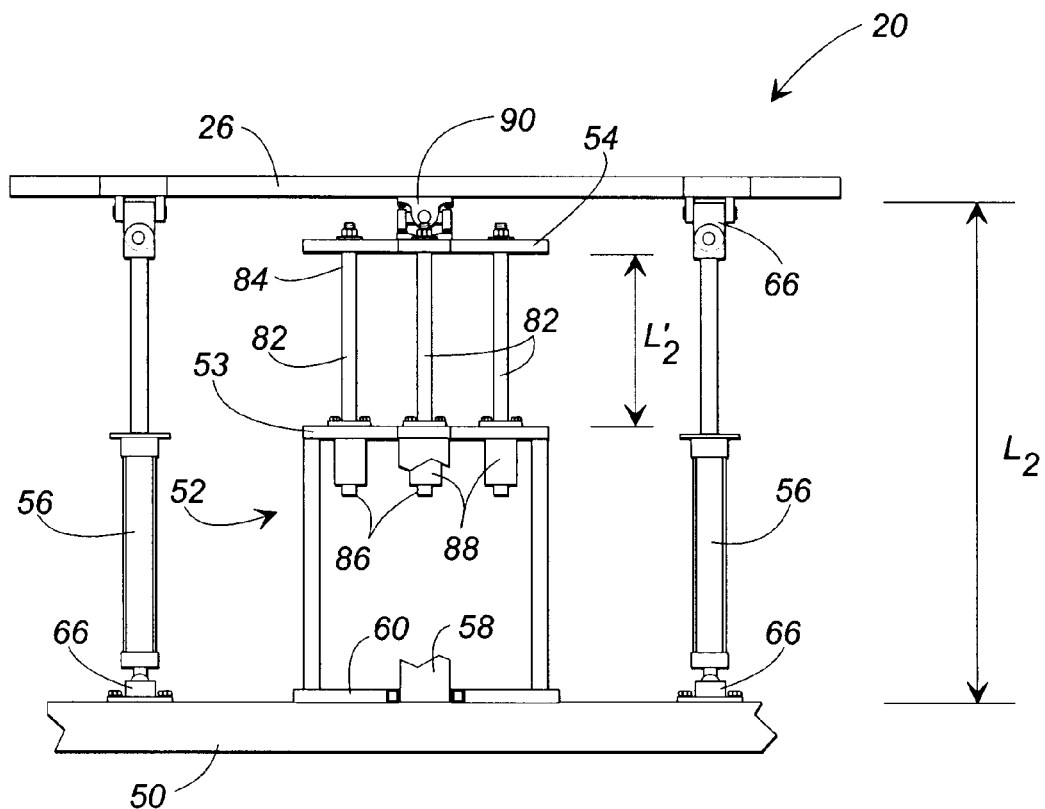
FIG. 6 is a front side view of the motion platform assembly with extended actuators and oriented in a substantially level manner relative to the ground.
Figure 7:
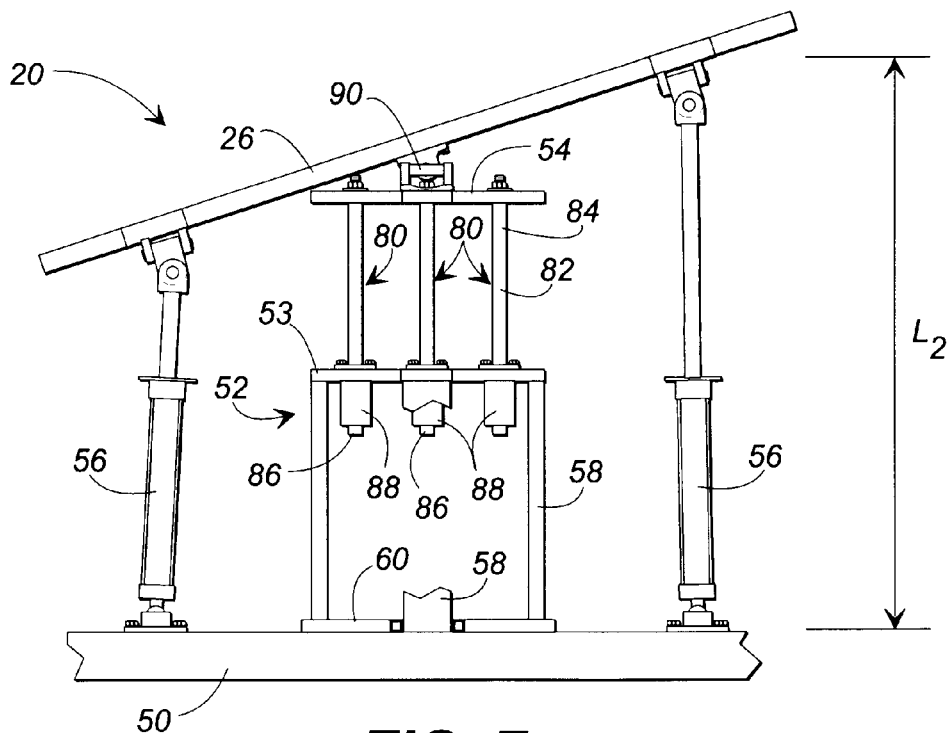
FIGS. 7 and 8 are front side views illustrating the motion platform assembly with extend actuators and tilted to the left or right respectively.
Figure 8:
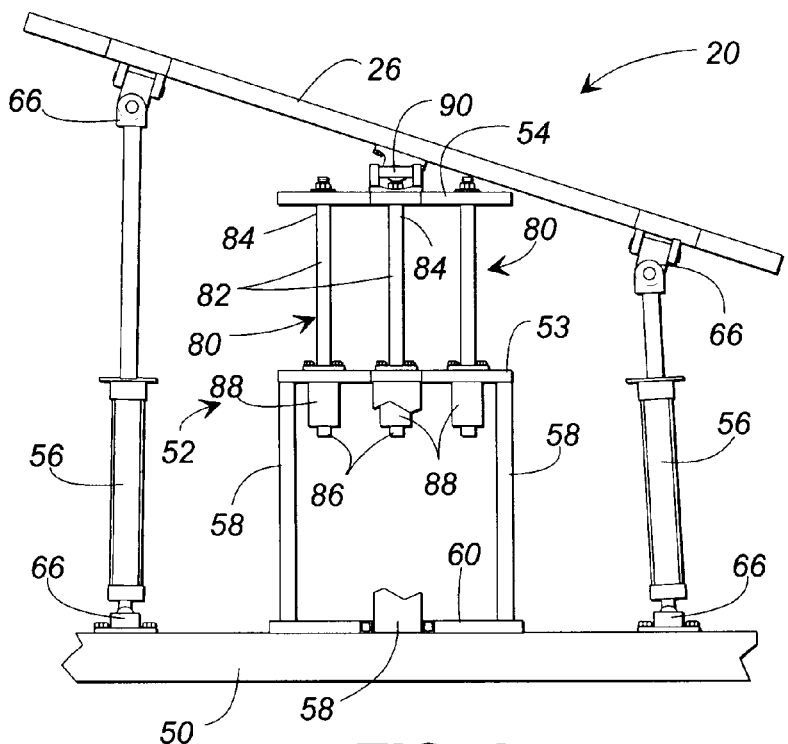

FIGS. 5 and 6 illustrate the stabilized platform 54 oriented in a manner parallel to the mounting platform 53 of the mounting pedestal 52. In order to restrict movement of the stabilized platform 54 relative to the mounting pedestal 52, the linear bearings 80 permit only vertical translation of the stabilized platform 54 in both directions relative to the mounting pedestal 52. As shown in FIGS. 5 and 6, the linear bearings 80 are extendable to increase and decrease a length L' thereof between the mounting pedestal 52 and the stabilized platform 54. The length L' is confirmed by a minimum length $L'_1$ and a maximum length $L'_2$. FIGS. 6–8 illustrate the stabilized platform 54 extended above the mounting pedestal 52. The linear bearings 80 resist the shear forces acting upon the stabilized platform 54 when the stabilized platform 54 is vertically extended from the mounting pedestal 52. FIGS. 7 and 8 illustrate the cage 26 tilted to the left and right respectively in response to the independent movement of the actuators 56. Except for vertical translation, the stabilized platform 54 remains stationary.

Still referring to FIGS. 5 and 6, the self-aligning linear bearings 80 include a bearing shaft 82 having a top end 84 and a bottom end 86. The top end 84 of the shaft 82 is fixedly attached with fasteners to the stabilized platform 54 as best shown in FIGS. 3 and 4. The linear bearing 80 also includes a housing cylinder 88 which is attached by fasteners to the top of the mounting pedestal 52. The housing cylinder 88 is received through an aperture in the mounting pedestal 52. The bearing shaft 82 is slidingly engaged to the bearing's housing cylinder 88. The bottom end 86 of the bearing shaft 82 extends through the housing cylinder 88 to the underside of the mounting pedestal 52. The bearing shaft 82 is permitted to reciprocate in the bearing housing cylinder 88, in response to the movement of the actuators 56, during operation of the motion platform assembly 20. The motion of the actuators 56, in combination with the changing length L' of the linear bearings 80, simulates heave. Because the bearing shaft 82 is confined to permit only vertical motion and the bearing housing cylinder 88 has a large enough surface area for confining the bearing shaft 82, the linear bearings 80 are capable of withstanding the shear forces when the stabilized platform 54 is extended above the mounting pedestal 52 as explained above.

According to another embodiment of the present invention, the motion platform assembly further includes a universal joint 90 fixedly secured by fasteners to the top of the stabilized platform 54. The universal joint 90 is also attached to the cage 26. Because the universal joint 90 does not itself allow rotation about the vertical axis, the universal joint 90 eliminates yaw in the motion platform assembly 20 and, therefore, reduces the degrees of freedom to three. However, the universal joint 90 allows pitch and roll. Preferably, the universal joint 90 is an automobile universal joint available from any automobile parts supplier.

Figure 9:
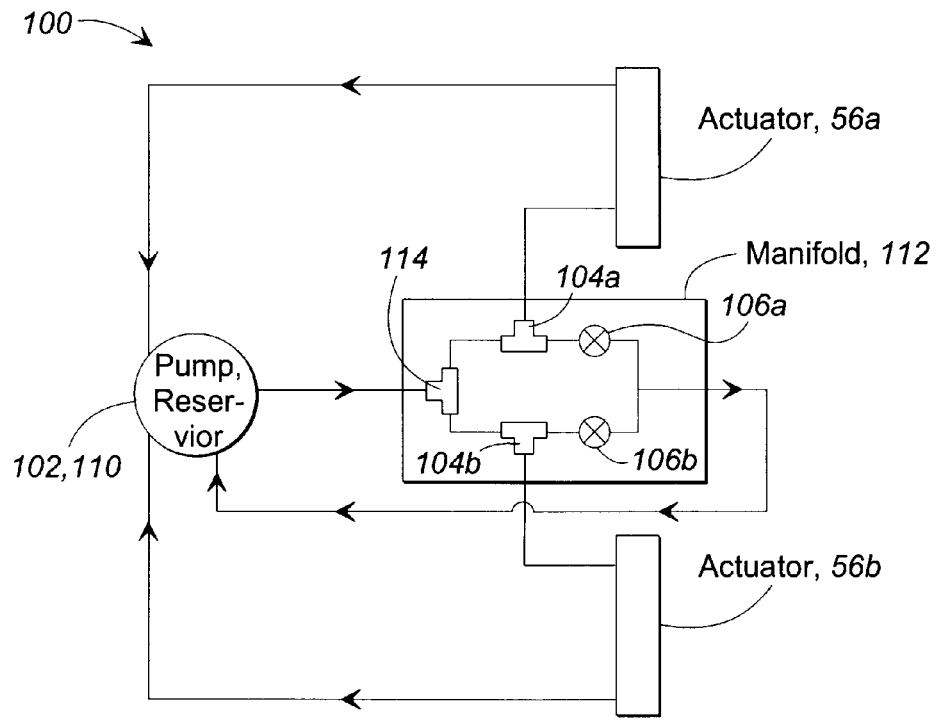
FIG. 9 illustrates one embodiment of a hydraulic schematic for actuating the hydraulic actuators of the motion platform assembly.

FIG. 9 illustrates one embodiment of a hydraulic schematic of a hydraulic system 100 used for practicing the present invention. The schematic shown in FIG. 9 incorporates two hydraulic actuators 56. Therefore, for a motion simulator 22 having four actuators 56, it is preferable to incorporate two of the hydraulic systems 100 shown in FIG. 9.

In one embodiment, the present invention comprises a pair of hydraulic pumps 102, T-connectors 104, and variable flow one-way valves 106. A single hydraulic pump 102, T-connector 104, and one-way valve 106 defines a continuous hydraulic loop. One actuator 56 is in fluid communication with one T-connector 104. The hydraulic pump 102 includes a reservoir 110 for holding the hydraulic fluid to operate the hydraulic system 100. A typical hydraulic pump 102 suitable for practicing the present invention is available from John S. Barnes Corp., of Rockford, Ill. As shown in FIG. 9, hydraulic fluid proceeds from the pump 102 to a manifold 112. Preferably, the conduit leading from the pump 102 into manifold 112 should be approximately ⅜ inches. The manifold 112 includes two T-connectors 104, and two one-way valves 106. A manifold 112 suitable for use in the present invention is available from Hydraforce, Inc., of Lincolnshire, Ill.

Preferably, hydraulic fluid is pumped from the pump 102 at a flow rate of about 4 gallons/minute to the manifold 112. A flow divider 114 within the manifold 112 divides the flow of the hydraulic fluid in half such that 2 gallons/minute is provide to each of the T-connectors 104a and 104b. The flow divider 114 guarantees a constant flow of hydraulic fluid to T-connectors 104 at any pressure. The hydraulic fluid in each line from T-connectors 104a and 104b then proceeds to the one-way valves 106a and 106b, respectively, where the opening and closing of the valves 106a, 106b extends and retracts the actuators 56a, 56b. The operation of the one-way valves 106 to actuate the actuators 56 is explained in greater detail below. Hydraulic fluid from the one-way valves 106 then returns to the reservoir 110 of the hydraulic pump 102 to complete the hydraulic loop. The conduit from the manifold 112 back to the pump 102 should be larger than the conduit leading into the manifold from the pump 102. Preferably, the conduit from the manifold 112 back to the pump 102 is approximately ¾ inches.

In order to fill the hydraulic loop and the actuators 56a, 56b with the hydraulic pump 102 pumping at a rate of 4 gallons/minute, the valves 106a, 106b should each be set to allow 2 gallons/minute. When the hydraulic loop is full, there is no back flow of hydraulic fluid from the actuators 56 through the one-way valves 106. In order to extend actuator 56a and increase length L, the one-way valve 106a is closed to permit less fluid therethrough than is being received from the pump 102. Because there is fluid buildup behind the one-way valve 106a and the piston of the actuator, the piston of the actuator 56a is moved upward in the actuator housing cylinder and the plunger is extended. Then, in order to retract the plunger, the one-way valve 106a is opened to a point where more than 2 gallons/minute is allowed therethrough. The process of varying the flow through a valve 106 to extend and retract an actuator 56 as described above is commonly referred to as metering. The hydraulic system 100 includes return lines from the actuators 56 in the event hydraulic fluid passes over the piston inside the actuator housing cylinder.

More specifically, in order to retract the actuator 56a and decrease length L, the one-way valve 106a is configured to permit a flow greater than that received from the pump 102. For example, when the one-way valve 106a is receiving 2 gallons/minute of hydraulic fluid from the pump 102, but the one-way valve 106a is sized for permitting 3 gallons/minute, the extra one gallon/minute of fluid is drained from the actuator 56a back through the T-connector 104a and through the one-way valve 106a. Because the actuator 56a has less hydraulic fluid and, therefore, less pressure behind the piston, the plunger can retract. The weight of the simulator 22 will force the plunger of the actuator 56a down.

The present invention may also include an hydraulic fluid filter 120 and cooling radiator 122 for circulating hydraulic fluid therethrough as needed. An electric fan (not shown) may also be incorporated with the radiator 122 to cool the hydraulic fluid. FIGS. 3 and 4 best illustrate the filter 120 and radiator 122 mounted to the mounting pedestal 52 between two of the supports 58. Preferably, there is one filter 120 and one radiator 122 with electric fan for each hydraulic pump 102.

Figure 10:
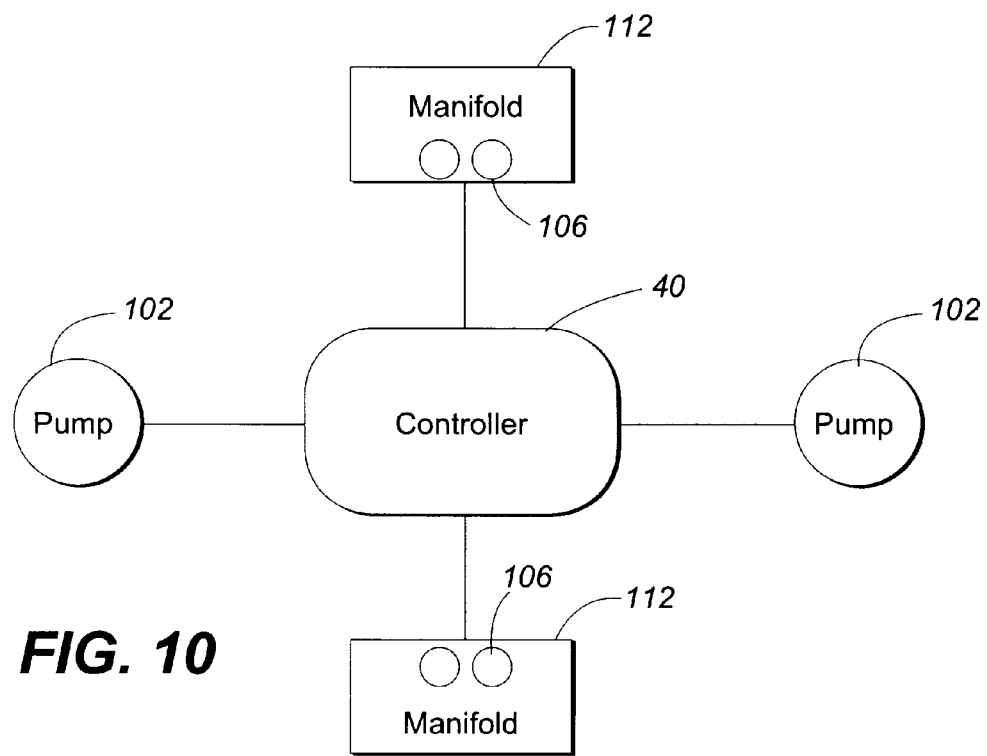
FIG. 10 is a diagram illustrating a controller in association with a pair of hydraulic pumps and a pair of manifolds.

The present invention further includes a controller 40 for functioning the motion platform assembly 20 and, therefore, the motion simulator 22. As shown in FIG. 10, the controller 40 controls the one-way valves 106 of manifold 112 and turns on and off the hydraulic pumps 102 in order to actuate the hydraulic actuators 56. The controller 40 typically includes a software module (not shown) and hardware components (not shown) and is responsive to the signals input by the user during operation of the motion simulator.

The use of the motion platform assembly 20 as described above constitutes an inventive method of the present invention in addition to the motion platform assembly itself. In practicing the method of providing simulated movement to a motion platform of a flight or vehicle simulator with the motion platform assembly 20 of the type described above, the steps include effecting movement of the motion platform relative to the base frame as described above. Then, in response to effecting movement of the motion platform, the method then includes the step of moving the stabilized platform to increase and decrease displacement between the mounting pedestal and the stabilized platform as described above. In response to moving the stabilized platform to increase the displacement between the mounting pedestal and the stabilized platform, the method then includes the step of restricting movement of the stabilized platform to thereby permit only vertical translation of the stabilized platform relative to the mounting pedestal.

The use of the hydraulic actuators and the hydraulics to actuate the actuators as described above also constitutes an inventive method. In practicing the method of actuating a hydraulic actuator as described above, the steps include providing a hydraulic pump, a T-connector, and a one-way valve to define a continuous loop as described above. The method also includes the step of providing an actuator coupled to the T-connector as described above. The method then includes the step of controlling the flow rate of hydraulic fluid through the one-way valve as described above. In response to controlling the flow rate through the one-way valve, the method then includes the step of actuating the hydraulic actuator.

The method of actuating a hydraulic actuator may also include the step of controlling the flow through the one-way valve such that the flow therethrough corresponds with the rate of hydraulic fluid being pumped by the hydraulic pump to the one-way valve in order to fill the hydraulic loop with hydraulic fluid. The method of actuating a hydraulic actuator may then also include the step of restricting the flow through the one-way valve in order to extend the hydraulic actuator as described above. Then, the method of actuating a hydraulic actuator may also include the step of expanding the one-way valve to permit a flow rate through said one-way valve greater than that being pumped by the hydraulic pump to the one-way valve in order to permit retraction of the actuator as described above.

The present invention has been illustrated in great detail by the above specific examples. It is to be understood that these examples are illustrative embodiments and that this invention is not to be limited by any of the examples or details in the description. Those skilled in the art will recognize that the present invention is capable of many modifications and variations without departing from the scope of the invention. Accordingly, the detailed description and examples are meant to be illustrative and are not meant to limit in any manner the scope of the invention as set forth in the following claims. Rather, the claims appended hereto are to be construed broadly within the scope and spirit of the invention.

What is claimed is:

1. A motion platform assembly for providing simulated motion to a motion platform of a flight or vehicle simulator, said motion platform assembly comprising:

a base frame;

a mounting pedestal coupled to said base frame;

a stabilized platform for at least partially supporting the motion platform;

actuator means coupled to said base frame for effecting movement of the motion platform with respect to said base frame; and stabilizing means, positioned between said stabilized platform and said mounting pedestal, for restricting movement of said stabilized platform relative to said mounting pedestal, said stabilizing means permitting substantially only vertical translation of said stabilized platform relative to said mounting pedestal in both directions.

2. The motion platform assembly of claim 1 wherein said actuator means comprises one or more actuators adapted to be coupled between said base frame and the motion platform, said actuator independently extendable to increase and decrease a length thereof.

3. The motion platform assembly of claim 2 wherein said actuator is substantially vertically-oriented.

4. The motion platform assembly of claim 2 wherein said actuator is a hydraulic actuator.

5. The motion platform assembly of claim 4 further comprising hydraulic means for controlling the extension of said hydraulic actuator.

6. The motion platform assembly of claim 4 further comprising a hydraulic pump, a T-connector and a one-way valve for defining a continuous hydraulic loop, said hydraulic pump for pumping hydraulic fluid through said hydraulic loop, said hydraulic actuator coupled to said T-connector.

7. The motion platform of claim 6 wherein said one-way valve permits hydraulic fluid therethrough at a first flow rate equal to that being pump by said hydraulic pump to said one-way valve to substantially fill said hydraulic loop with hydraulic fluid, said one-way valve permitting hydraulic fluid therethrough at a second flow rate less than that being pumped by said hydraulic pump in order to extend said hydraulic actuator, said one-way valve permitting hydraulic fluid therethrough at a third flow rate greater than that being pumped by said hydraulic pump to said one-way valve in order to permit hydraulic fluid to leave said hydraulic actuator to pass through said one-way valve and permit said hydraulic actuator to retract as a result of resistance placed upon said actuator from the motion simulator, said first flow rate being more than said second flow rate and less than said third flow rate, and said second flow rate being less than both said first and third flow rates, and said third flow rate being greater than both said first and second flow rates.

8. The motion platform assembly of claim 1 wherein said stabilizing means comprises a plurality of unpowered linear bearings extendable to increase and decrease a length thereof between said mounting pedestal and said stabilized platform, said linear bearings capable of resisting shear forces acting upon said stabilized platform when said stabilized platform is vertically extended from said mounting pedestal.

9. The motion platform assembly of claim 1 further comprising a universal joint coupled to said stabilized platform.

10. The motion platform assembly of claim 1 further comprising a controller coupled to said actuator means for functioning said motion platform assembly.

11. A motion platform assembly that provides simulated motion to a motion platform of a motion simulator in at least three degrees of motion that include pitch, roll and heave, said motion platform assembly comprising:

a base frame;

a mounting pedestal coupled to said base frame;

a stabilized platform for at least partially supporting the motion platform;

a plurality of actuators coupled to said base frame for effecting movement of the motion platform with respect to said base frame; and a stabilizing assembly, positioned between said stabilized platform and said mounting pedestal, for restricting movement of said stabilized platform relative to said mounting pedestal, said stabilizing assembly permitting substantially only vertical translation of said stabilized platform relative to said mounting pedestal in both directions to simulate heave.

12. The motion platform assembly of claim 11 wherein said actuators independently extend to increase and decrease a length thereof.

13. The motion platform assembly of claim 11 wherein said stabilizing assembly comprises a plurality of unpowered linear bearings extendable to increase and decrease a length thereof between said mounting pedestal and said stabilized platform, said linear bearings capable of resisting shear forces acting upon said stabilized platform when said stabilized platform is vertically extended from said mounting pedestal.

14. The motion platform assembly of claim 11 further comprising a universal joint adapted to be coupled to and intermediate to said stabilized platform and the motion platform.

15. A method for providing simulated movement to a motion platform of a flight or vehicle simulator, said method comprising the steps of:

providing a motion platform assembly comprising a base frame, a mounting pedestal, and a stabilized platform for at least partially supporting the motion platform;

effecting movement of the motion platform relative to said base frame;

in response to said step of effecting movement of the motion platform, moving said stabilized platform to increase and decrease displacement between said mounting pedestal and said stabilized platform; and in response to moving said stabilized platform to increase displacement between said mounting pedestal and said stabilized platform, restricting movement of said stabilized platform to thereby permit substantially only vertical translation of said stabilized platform relative to said mounting pedestal.

16. A motion platform assembly for providing motion simulation to a motion simulator, said motion platform assembly comprising:

at least one hydraulic actuator for effecting movement in the motion simulator; and a hydraulic system coupled to said hydraulic actuator, said hydraulic system comprising a hydraulic pump, a one-way valve and a T-connector for defining a continuous hydraulic loop, said hydraulic pump for pumping hydraulic fluid through said hydraulic loop, said hydraulic actuator coupled to said T-connector, said one-way valve permitting the hydraulic fluid therethrough at a first flow rate equal to that being pump by said hydraulic pump to said one-way valve to substantially fill said hydraulic loop with hydraulic fluid, said one-way valve permitting hydraulic fluid therethrough at a second flow rate less than that being pumped by said hydraulic pump in order to extend said hydraulic actuator, said one-way valve permitting hydraulic fluid therethrough at a third flow rate greater than that being pumped by said hydraulic pump to said one-way valve in order to permit fluid to leave said hydraulic actuator and said hydraulic actuator to retract as a result of resistance placed upon said actuator from the motion simulator, said first flow rate being more than said second flow rate and less than said third flow rate, and said second flow rate being less than both said first and third flow rates, and said third flow rate being greater than both said first and second flow rates.

17. A method of actuating a hydraulic actuator to provide simulated movement to a motion simulator, said method comprising the steps of:

providing a hydraulic pump, a T-connector and a one-way valve to define a continuous hydraulic loop;

providing a hydraulic actuator coupled to said T-connector;

controlling the flow rate of hydraulic fluid through said one-way valve; and in response to said step of controlling the flow rate of hydraulic fluid through said one-way valve, actuating said hydraulic actuator.

18. The method of claim 17 wherein said step of controlling the flow rate of hydraulic fluid through said one-way valve comprises corresponding the flow rate of the hydraulic fluid through said one-way valve with the rate of hydraulic fluid being pumped by said hydraulic pump in order to substantially fill said hydraulic loop with hydraulic fluid.

19. The method of claim 18 wherein said step of controlling the flow rate of hydraulic fluid through said one-way valve further comprises restricting the flow of hydraulic fluid through said one-way valve from said hydraulic pump in order to extend said hydraulic actuator.

20. The method of claim 18 wherein said step of controlling the flow rate of hydraulic fluid through said one-way valve further comprises expanding said one-way valve to permit a flow rate of hydraulic fluid therethrough from said hydraulic pump greater than that being pumped by said hydraulic pump in order to permit retraction of said actuator.

21. A motion platform assembly that provides simulated motion to a motion platform of a motion simulator in at least three degrees of motion that include pitch, roll and heave, said motion platform assembly comprising:

a base frame;

a mounting pedestal coupled to said base frame;

a stabilized platform for at least partially supporting the motion platform;

a plurality of actuators coupled to said base frame for effecting movement of the motion platform with respect to said base frame;

a stabilizing assembly, positioned between said stabilized platform and said mounting pedestal, for restricting movement of said stabilized platform relative to said mounting pedestal, said stabilizing assembly permitting substantially only vertical translation of said stabilized platform relative to said mounting pedestal in both directions to simulate heave;

at least one hydraulic actuator for effecting movement of the motion platform relative to said base frame; and a hydraulic system coupled to said hydraulic actuator, said hydraulic system comprising a hydraulic pump, a one-way valve and a T-connector for defining a continuous hydraulic loop, said hydraulic pump for pumping hydraulic fluid through said hydraulic loop, said hydraulic actuator coupled to said T-connector, said one-way valve permitting the hydraulic fluid therethrough at a first flow rate equal to that being pump by said hydraulic pump to said one-way valve to substantially fill said hydraulic loop with hydraulic fluid, said one-way valve permitting hydraulic fluid therethrough at a second flow rate less than that being pumped by said hydraulic pump in order to extend said hydraulic actuator, said one-way valve permitting hydraulic fluid therethrough at a third flow rate greater than that being pumped by said hydraulic pump to said one-way valve in order to permit fluid to leave said hydraulic actuator and said hydraulic actuator to retract as a result of resistance placed upon said actuator from the motion simulator, said first flow rate being more than said second flow rate and less than said third flow rate, and said second flow rate being less than both said first and third flow rates, and said third flow rate being greater than both said first and second flow rates.

* * * * *